United States Patent [19]
Nagashima et al.

[11] Patent Number: 5,603,742
[45] Date of Patent: Feb. 18, 1997

[54] DUST REMOVING APPARATUS

[75] Inventors: Kiyoshi Nagashima; Tetsuya Ueda; Hisataka Urakata; Tetsuya Fujino; Yuichiro Kitagawa, all of Nagasaki; Satoshi Uchida, Tokyo; Yasuo Akitu, Handa; Yosiaki Hori, Nagoya, all of Japan

[73] Assignees: Mitsubishi Jukogyo Kabushiki Kaisha, Tokyo; NGK Insulators, Ltd., Nagoya, both of Japan

[21] Appl. No.: 374,723

[22] PCT Filed: Jun. 27, 1994

[86] PCT No.: PCT/JP94/01032

§ 371 Date: Jan. 27, 1995

§ 102(e) Date: Jan. 27, 1995

[87] PCT Pub. No.: WO95/00233

PCT Pub. Date: May 1, 1995

[30] Foreign Application Priority Data

Jun. 28, 1993 [JP] Japan .................................. 5-156910
May 26, 1994 [JP] Japan .................................. 6-112603

[51] Int. Cl.⁶ .................................................. B01D 46/00
[52] U.S. Cl. .............................. 55/502; 55/506; 55/523
[58] Field of Search .............................. 55/502, 506, 508, 55/523

[56] References Cited

U.S. PATENT DOCUMENTS

| | | |
|---|---|---|
| 3,854,888 | 12/1974 | Frietzsche et al. ................ 55/502 |
| 4,238,455 | 12/1980 | Ogiwara . |
| 4,419,108 | 12/1983 | Frost et al. ......................... 55/502 |
| 4,709,549 | 12/1987 | Lepperhoff ......................... 55/502 |
| 4,735,638 | 4/1988 | Ciliberti et al. .................... 55/523 |
| 4,814,146 | 3/1989 | Brand et al. ....................... 55/502 |
| 4,946,487 | 8/1990 | Butkus ............................... 55/523 |
| 4,960,448 | 10/1990 | Zievers .............................. 55/502 |
| 4,968,467 | 11/1990 | Zievers .............................. 55/523 |
| 5,078,765 | 1/1992 | Schollhorn et al. .............. 55/502 |
| 5,228,892 | 7/1993 | Akitsu et al. . |
| 5,248,481 | 9/1993 | Bloom et al. ..................... 55/523 |
| 5,296,010 | 3/1994 | Clark et al. ....................... 55/523 |

FOREIGN PATENT DOCUMENTS

| | | |
|---|---|---|
| 0410200 | 7/1990 | European Pat. Off. . |
| 2-75315 | 3/1990 | Japan . |
| 5-269316 | 10/1993 | Japan . |

*Primary Examiner*—C. Scott Bushey
*Attorney, Agent, or Firm*—Rothwell, Figg, Ernst & Kurz

[57] ABSTRACT

A dust removing apparatus includes a filter and mounting frame which prevent leakage of dirty gas and improve the collection factor of soot dust even if dirty gas of a high temperature is subjected to a dust removing operation. The apparatus includes a filter element held in a filter element mounting frame, wherein a flange is disposed on an end of the filter element located on the side which receives dirty gas, and wherein the side of the flange opposite the dirty gas side is pressed against a flange of the filter element mounting frame. A seal packing is disposed between the filter flange and frame flange to seal the elements. Further, a plurality of honeycomb filter elements structured as above may be collected and accommodated to form a honeycomb pack.

2 Claims, 9 Drawing Sheets

HEAT CURVE

FIG. 16 (A) (PRIOR ART)
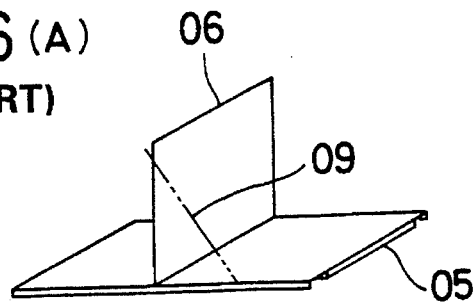
FIG. 16 (B) (PRIOR ART)
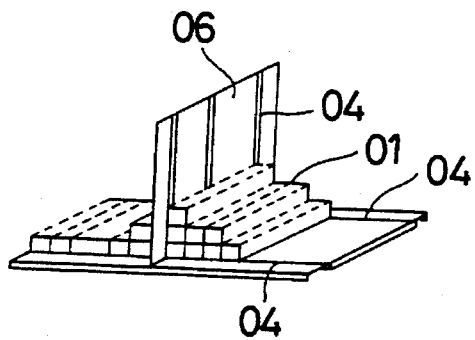
FIG. 16 (E) (PRIOR ART)
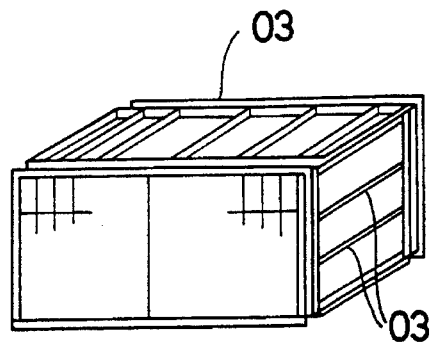
FIG. 16 (C) (PRIOR ART)
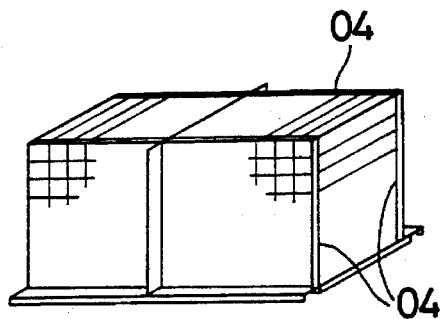
FIG. 16 (D) (PRIOR ART)
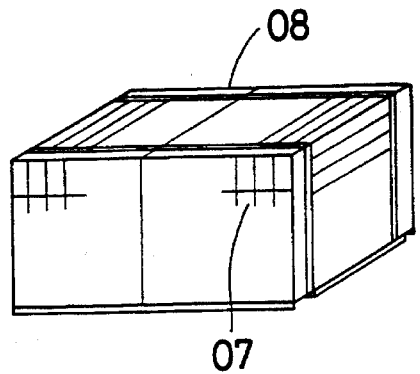

DUST REMOVING APPARATUS

TECHNICAL FIELD

The present invention relates to a dust removing apparatus for removing combustion gas, coal gas and the like.

DESCRIPTION OF BACKGROUND ART

FIG. 11 schematically illustrates a filter element used heretofore as a dust removing apparatus for combustion gas and gas produced by gasifying petrified fuel such as coal. Referring to FIG. 11, a prior art filter is described for the removal of soot dust contained in combustion exhaust gas as an example.

In FIG. 11, a pillar-shaped filter element 011 having a substantially square cross-section is accommodated in a filter element mounting frame 012 made of metal or ceramics and both ends of the element are held by metal fittings 013. Further, filling material 014 such as felt is filled into a gap between the filter element 011 and the frame 012 to seal therebetween.

Dirty gas 21 containing soot dust in combustion exhaust gas is passed through the filter element 011 to be filtered therein, so that soot dust in the exhaust gas is removed and purified gas 22 is discharged.

As shown in FIG. 13, a plurality of the filter elements are collected and are accommodated into an outer frame 023 to be used as a pack.

Further, FIG. 14 illustrates a conventional dust removing apparatus using a honeycomb pack in which a unit number of honeycomb type filter elements are collected to form a unit lot. The apparatus includes thin paper-like seal packings 02 disposed on the side receiving dirty gas and on the side emitting purified gas of filter elements 01 to hold the seal packings 02 between contact surfaces of the filter elements 01. The seal packings 02 are wound on all of the filter elements 01 arranged into a plurality of row and columns and all of the filter elements are finally fastened by a honeycomb pack frame externally. As shown in FIG. 15, the whole outer periphery of the filter elements 01 is wound at inlet and outlet sides thereof by seal packings 04 and is fastened by the honeycomb pack frame 03 to effect sealing in the honeycomb pack frame 03.

FIG. 16 schematically illustrates an order of assembling such a honeycomb pack. More particularly, first of all, as shown in FIG. 16(A), a honeycomb pack bottom frame 05 and a center partition plate 06 are held by a jig 09. Then, as shown in FIG. 16(B), the filter elements 01 each having the above paper-like seal packings 02 which are previously wound on both ends of the filter element are piled up. In this case, seal packings 04 are disposed on outer end portions of the bottom partition plate 05 and the center partition plate 06.

After the filter elements have been piled up completely, seal packings 04 are attached on the whole outer peripheries of the piled filter elements as shown in FIG. 16(C). Then, as shown in FIG. 16(D), an upstream lattice frame 07 is fitted onto the pack on the dirty gas side thereof and a downstream lattice frame 08 is fitted onto the pack on the purified gas side thereof. Finally, as shown in FIG. 16(E), the pack frame 03 disposed on the upper surface is fastened to complete the pack.

In the dust removing apparatus fabricated by the above-described processes, the dimensional accuracy of the filter element is varied and, accordingly, adjustment of clearance is performed by the piling method of the packings. Thus, the sealing performance is influenced by the technical skill of operators who perform the assembling of the pack as described above.

In the conventional filter element shown in FIG. 11, when the temperature of the dirty gas containing the soot dust is high, size difference between the filter element 011 and the filter element mounting frame 012 in which the filter element is accommodated is increased due to the high temperature. The increased size difference cannot be covered by the resilient width of the filling material 014 such as felt filled therebetween to thereby form the clearance. Accordingly, as shown by arrow a of FIG. 12, gas is leaked through the clearance and part of soot dust cannot be filtered by the filter element 011 to thereby reduce the soot dust collection factor.

For example, when the filter element 011 is formed into a square pillar having one side of 200 mm and a temperature of the dirty gas 21 is 800° C. on condition that the filter element 011 is made of ceramics and has the coefficient of thermal expansion of $1 \times 10^{-6}/°$ C., and the filter element mounting frame 012 is made of metal and has the coefficient of thermal expansion of $18 \times 10^{-6}/°$ C., an increase $\Delta Hcl$ of the clearance between the filter element 011 and the filter element mounting frame 012 in the gas flowing direction upon the normal assembling (20° C.) and the high-temperature operation is given by $$\Delta Hcl = 200 \times (18-1) \times 10^{-6} \times (800-20) = 2.652 \text{ mm}$$

Further, in the conventional dust removing apparatus shown in FIG. 14, the seal packings are wound on the gas inlet side surfaces and the gas outlet side surfaces of the filter elements, and the filter elements are piled up vertically and horizontally. In addition, the packings are provided under the honeycomb pack frame and the frame is fastened to effect complete sealing. Accordingly, the assembling of the apparatus is apt to be affected by the operator's assembling ability. Also, errors in the element dimension and a problem of the extension difference occur at the high temperature. In other words, since the honeycomb pack frame made of metal expands a larger amount as compared with the element made of ceramics the occurrence of looseness is unavoidable even if the pack is sufficiently fastened. Further, in the case of the class of 1,000 mm $H_2O$ in which a differential pressure between the inlet side and the outlet side of gas is very large, there occurs a phenomenon that the seal packing on the inlet side is shifted inside gradually. Accordingly, the sealing of the honeycomb pack of the dust removing apparatus has such problems and its improvement there of is needed in the art.

DISCLOSURE OF THE INVENTION

The present invention provides a dust removing apparatus capable of solving the problems in the above-mentioned dust removing apparatus.

The dust removing apparatus of the present invention provides the following measures.

(1) The dust removing apparatus for converting dirty gas into purified gas by a filter element held in a filter element mounting frame is characterized in that a flange is disposed on the dirty gas side of the filter element, and the purified gas side of the flange and the dirty gas side of a flange of the filter element mounting frame positioned on the purified gas side with respect to the flange of the filter element are disposed opposite to each other to hold the filter element in the filter element mounting frame.

(2) The dust removing apparatus according to the item (1) is characterized by comprising a seal packing disposed between the purified gas side of the flange of the filter element and the dirty gas side of the flange of the filter element mounting frame.

(3) The dust removing apparatus in which a plurality of honeycomb filter elements of porous ceramic substance are collected and accommodated to form a unit lot and dirty gas is converted into purified gas by the filter element, is characterized in that a flange is disposed on the dirty gas side of each of the filter elements and a seal packing is held between the purified gas side of the flange and the dirty gas side of a flange of a filter element mounting frame mounted to a honeycomb pack frame body to hold the filter element.

(4) The dust removing apparatus according to the item (3) is characterized by comprising mounting metal fittings disposed on both the dirty gas inlet side and the purified gas outlet side of the filter element in the filter element mounting frame, the mounting metal fitting on the dirty gas inlet side including a pressing bolt for pressing the flange of the filter element. A holding piece of the filter element is disposed between the filter element near the purified gas outlet and the filter element mounting frame, and cotton-like ceramic fiber is provided for filling space between the filter element mounting frame and the filter element.

(5) The dust removing apparatus according to the item (3) or (4) is characterized by comprising pack mounting metal fittings disposed on both the dirty gas side and the purified gas side of the honeycomb pack frame body, one of the pack mounting metal fittings being fixedly mounted to a pack mounting frame of a gas duct to hold a seal packing therebetween.

Operation of the present invention is now described as follows (with reference to measures (1)–(5) set forth above).

In the present invention (1), the filter element accommodated in the filter element mounting frame is pressed to the purified gas side from the dirty gas side by pressure of the dirty gas to thereby press the purified gas side of the flange of the filter element to the dirty gas side of the flange of the filter element mounting frame. Accordingly, even if there is the thermal extension difference between the filter element and the filter element mounting frame, the purified gas side of the flange of the filter element is always pressed to the dirty gas side of the flange of the filter element mounting frame to thereby prevent the leakage of the dirty gas and improve the collection factor of soot dust.

In the present invention (2), the seal packing is disposed between the purified gas side of the flange of the filter element and the dirty gas side of the flange of the filter element mounting frame in the invention (1) so that the seal packing is fastened or compressed between the flange of the filter element and the flange of the filter element mounting frame by pressure of dirty gas to be processed to thereby perform sealing with respect to the dirty gas and collection of soot gas more exactly.

In the present invention (3), the seal packing is held between the flange of the dirty gas side of the filter element and the flange of the filter element mounting frame mounted to the honeycomb pack frame body to hold the filter elements to attain the stable sealing. Further, the flange on the dirty gas side of the filter element is pressed to the flange of the filter element mounting frame through the packing by pressure of the dirty gas to be processed to be utilized as a pressing force to the packing and the filter element mounting force to thereby attain the sealing operation exactly. Furthermore, since the flange on the dirty gas side of the filter elements is held by the flange of the filter element mounting frame, there occurs no problem such as looseness and reduction of the sealing performance even if there is the extension difference of metal and the filter element of ceramic substance due to high temperature.

In the present invention (4), both sides of the filter element of the invention (3) are exactly held by the mounting metal fitting of the filter element mounting frame and the pressing bolt of the mounting metal fitting on the dirty gas side. Further, in the dust removing operation in the reverse direction, force in the opposite direction to that in the normal dust removing operation acts on the filter element, while the filter element is held by the pressing bolt without a gap and shock is not exerted on the filter element. In addition, by disposing the holding piece in the vicinity of the purified gas outlet between the filter element and the filter element mounting frame, the filter element is positioned and is not damaged at this position. Furthermore, vibration of the filter element upon the dust removing operation in the reverse direction can be prevented by the cotton-like ceramic fiber filled in the space between the filter element mounting frame and the filter element to thereby prevent the filter element from being damaged.

In the present invention (5), one of a plurality of pack mounting metal fittings of the honeycomb pack frame body holding the filter element of the invention (3) or (4) is fixedly mounted to the pack mounting frame of the gas duct through the seal packing and the filter pack provided with a plurality of filter elements can be mounted to the gas duct exactly with good sealing characteristic.

The effects attained by the present invention will now be described. In the present invention, since the flange disposed in the end of the dirty gas side of the filter element is pressed to the flange on the dirty gas side of the filter element mounting frame by pressure of the dirty gas, the leakage of the dirty gas can be prevented effectively and the collection factor of soot dust can be improved even if the dirty gas having a high temperature is processed and the thermal extension difference occurs between the filter element and the filter element mounting frame.

Further, as described above, the problems of the conventional honeycomb pack can be overcome as follows.

(1) By performing sealing between the flange on the dirty gas side of the filter element and the flange on the dirty gas side of the filter element mounting flange, pressure of the dirty gas can be utilized to compress the seal packing and improve the sealing characteristic.

Further, since sealing is performed between the filter element on the dirty gas side and the flange of the filter element mounting frame, the sealing performance is not reduced by the extension difference of the filter element and the filter element mounting frame occurring under high temperature.

(2) Even if force in the opposite direction to that in the normal dust removing operation acts on the filter element upon the dust removing operation in the reverse direction, the filter element is held exactly by the pressing bolt of the mounting metal fitting of the filter element mounting frame and shock is not exerted on the filter element. Further, the filter element can be held by the holding piece of the filter element and the cotton-like ceramic fiber exactly without occurrence of vibration to prevent damage of the filter element.

(3) The honeycomb pack frame body is mounted to the pack mounting frame of the gas duct through the seal packing, so that the sealing performance can be improved.

(4) Since influence due to the ability of the assembling operator is not affected as in the conventional honeycomb pack, not only the sealing performance but also the reliability of the whole honeycomb pack can be improved.

BRIEF DESCRIPTION OF THE DRAWINGS

FIGS. 16(A) to 16(E) schematically illustrate assembling processes of a conventional honeycomb pack.

DETAILED DESCRIPTION OF PREFERRED EMBODIMENTS

Figure 1:
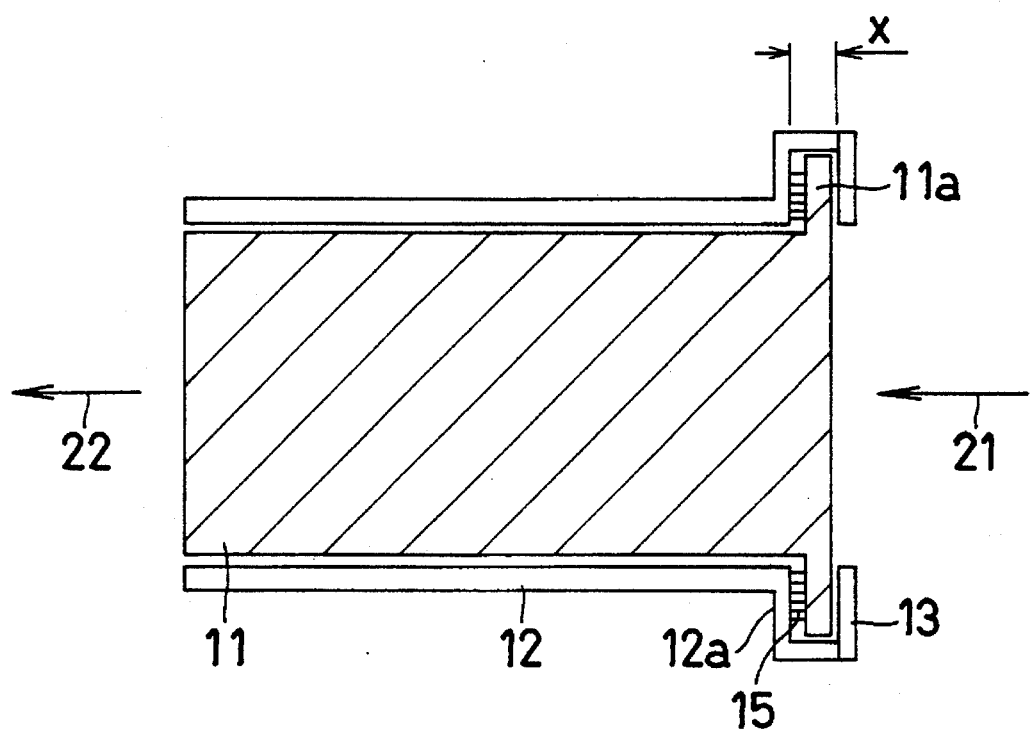
FIG. 1 is a diagram illustrating a structure of a dust removing apparatus according to a first embodiment of the present invention.

A first embodiment of the present invention is described with reference to FIGS. 1 and 2. Numeral 11 denotes a pillar-shaped filter element having a square cross-section. The filter element 11 is made of porous material such as ceramics. Disposed at an end on the side receiving dirty gas 21 of the filter element 11 is a seal flange 11a which is protruded in the direction perpendicular to an axis of the filter element 11. Numeral 12 denotes a filter element mounting frame for movably accommodating the filter element 11 in the gas flowing direction. A seal flange 12a for forming a recess corresponding to the seal flange 11a of the filter element 11 is formed at an end on the side of dirty gas 21 of the mounting frame 12, the flange 12a positioned on the purified gas side with respect to the seal flange 11a of the filter element 11. The seal flange 11a of the filter element 11 is disposed between the seal flange 12a and a metal fitting 13 attached on an end on the side receiving dirty gas 21 of the seal flange 12a. Further, a seal packing 15 made of ceramics fiber is held between the seal flanges 11a and 12a.

In the embodiment described above, the seal flange 11a of the filter element 11 is pressed on the seal flange 12a of the filter element mounting frame 12 by pressure of dirty gas 21 containing soot dust flowing in the direction of the arrow to clinch the seal packing 15 therebetween, so that the sealing characteristic is satisfactory and leakage of dirty gas 21 containing soot dust is prevented. Accordingly, even when the temperature of the dirty gas 21 is increased to produce a thermal extension difference between the filter element 11 and the filter element mounting frame 12, the seal flange 11a of the filter element 11 is always pressed on the seal flange 12a of the filter element mounting frame 12 and against the seal packing 15. Accordingly, the sealing characteristic for the dirty gas 21 can be ensured and the soot dust collection factor by the filter element 11 can be improved remarkably.

Figure 2:
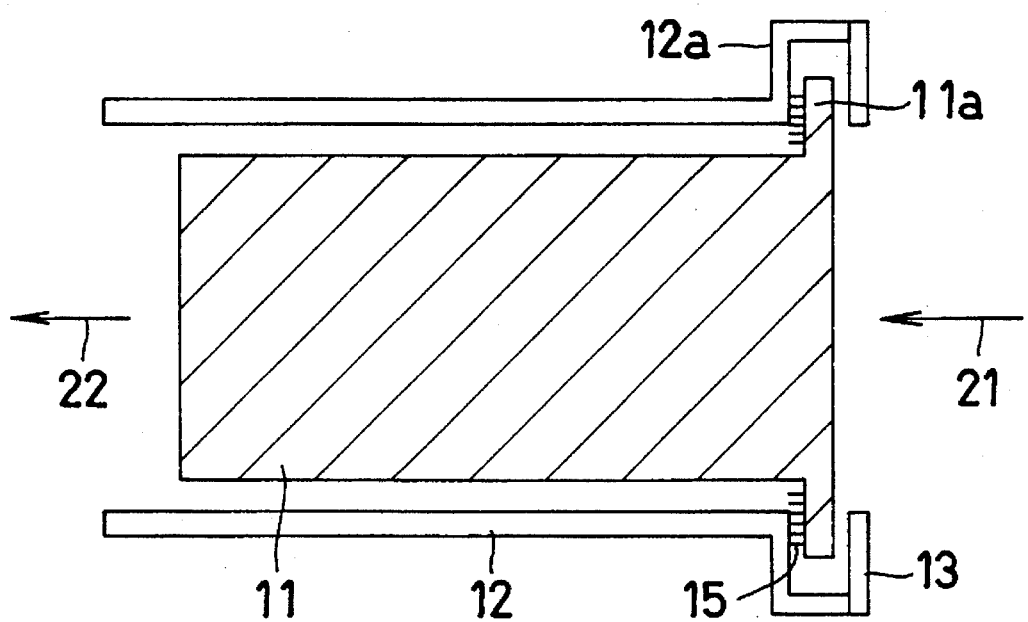
FIG. 2 is a diagram illustrating a structure of the dust removing apparatus according to the embodiment of FIG. 1 in a high temperature state.

For example, as shown in FIG. 1, when a distance x between opposite surfaces of the flange 12a of the filter element mounting frame 12 and the metal fitting 13 is 20 mm and the temperature of the dirty gas 21 is as high or higher than 800° C., on the condition that the filter element mounting frame 12 is made of metal and has the coefficient of thermal expansion of $18 \times 10^{31}$ $^6$/° C. and the filter element 11 is made of ceramics and has the coefficient of thermal expansion of $1 \times 10^{31}$ $^6$/° C., the increase $\Delta Hcl$ of the clearance produced by the thermal extension difference between the flanges 11a and 12a is given (as described above) by $$\Delta Hcl = °\times (18-1) \times 10^{-6} \times (800-20) = 2.652 \text{ mm}$$

However, even when the clearance is further increased, the seal flange 11a is always pressed on toward the seal flange 12a underground the seal packing 15 by the pressure of the dirty gas 21, and accordingly leakage of the dirty gas 21 does not occur.

Figure 3:
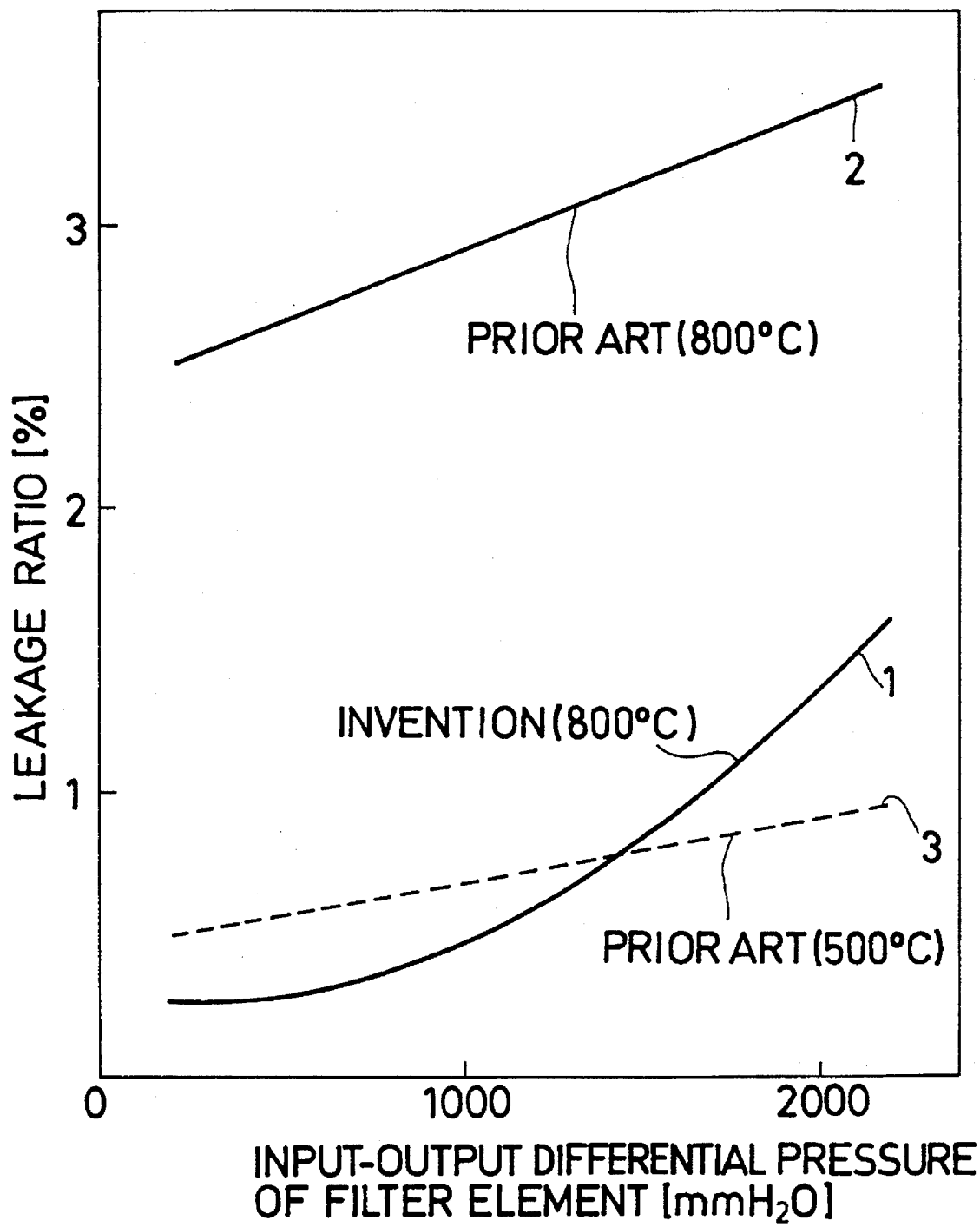
FIG. 3 is a graph showing a relation of a gas leakage factor and a differential pressure before and behind a filter according to a filter element of the present embodiment and a filter according to the prior art.
Figure 11:
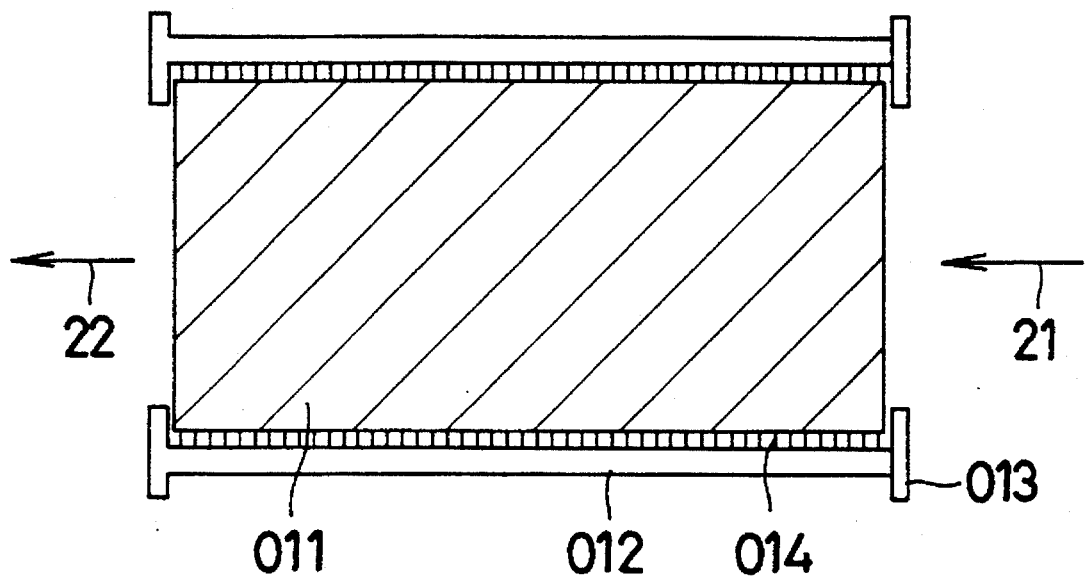
FIG. 11 is a schematic diagram illustrating a filter element of a conventional dust removing apparatus.
Figure 12:
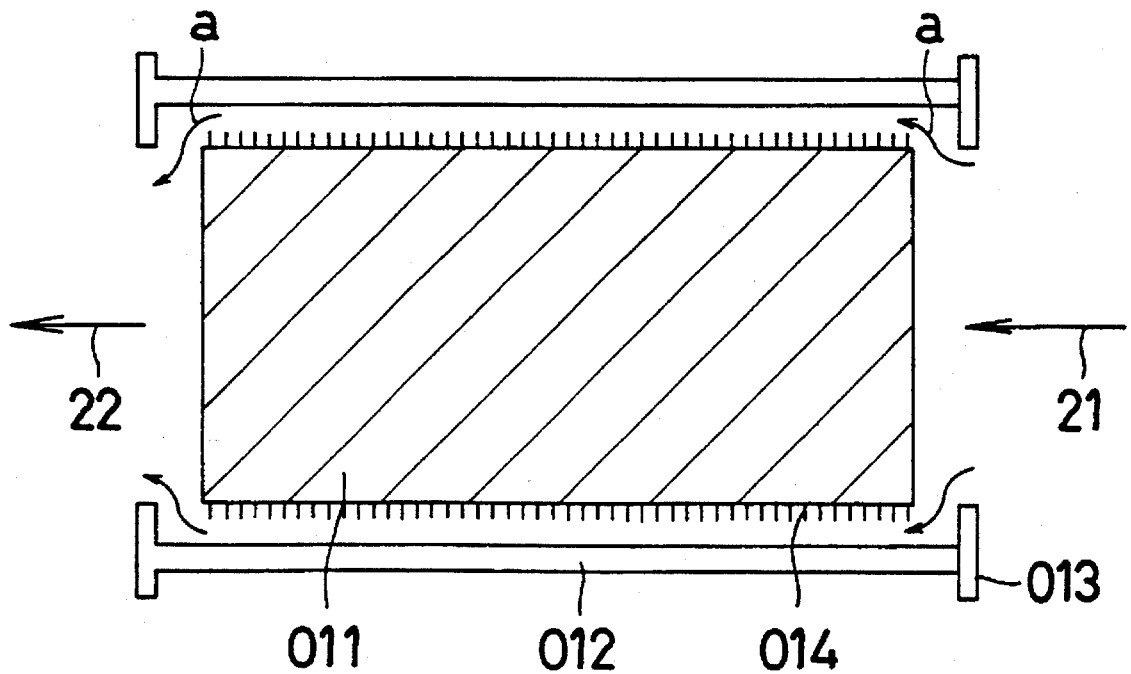
FIG. 12 is a schematic diagram illustrating the conventional dust removing apparatus in a high temperature state.
Figure 13:
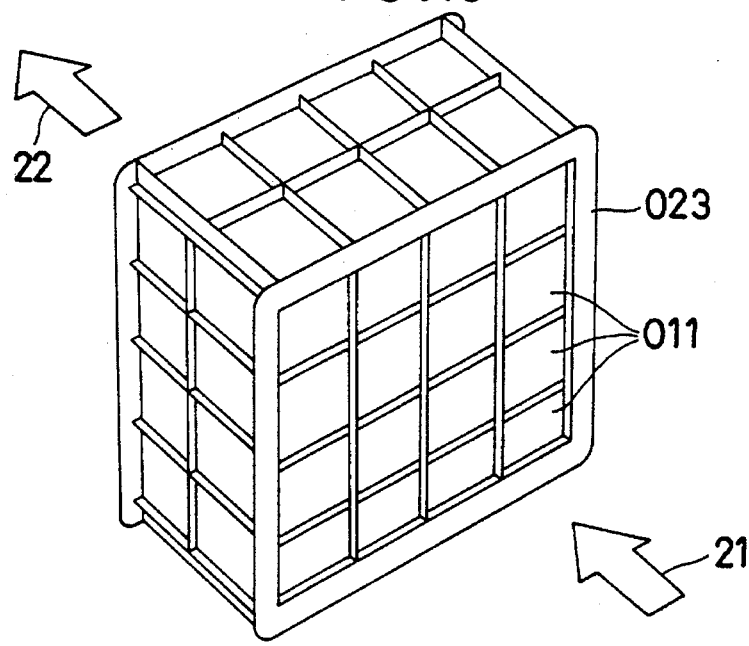
FIG. 13 is a perspective view showing the conventional filter element being packed.

FIG. 3 shows a relation between an input-output differential pressure and a leakage ratio of the filter element 11. In FIG. 3, the characteristic of the apparatus of the present invention is represented by line 1 and the conventional characteristics of the apparatus shown in FIGS. 11 and 12 are represented by lines 2 and 3. The line 3 represents the characteristic at the temperature of the dirty gas of 500° C. in the prior art apparatus and the leakage ratio thereof is not very large, while when the temperature of the exhaust gas is increased to 800° C., the leakage ratio of the prior art apparatus is increased several times as shown by the line 2. However, in the present invention, even when the temperature of the dirty gas reaches 800° C., the leakage ratio can be suppressed to the same degree or less as in the prior art as shown by the line 1.

Further, as shown in FIG. 3, in the present invention, even if the temperature of the dirty gas is high, the leakage ratio of the dirty gas in the differential pressure of about 1000 mm $H_2O$ can be suppressed to about 0.5%. Consequently, when the dirty gas having the concentration of soot dust at the inlet of 10 $g/Nm^3$ is subjected to the dust removing process, the concentration of soot dust at the outlet is about several hundreds $mg/Nm^3$ in the conventional dust removing apparatus, whereas in the present invention the concentration of soot dust at the outlet can be reduced to about several tens $mg/Nm^3$.

Figure 4:
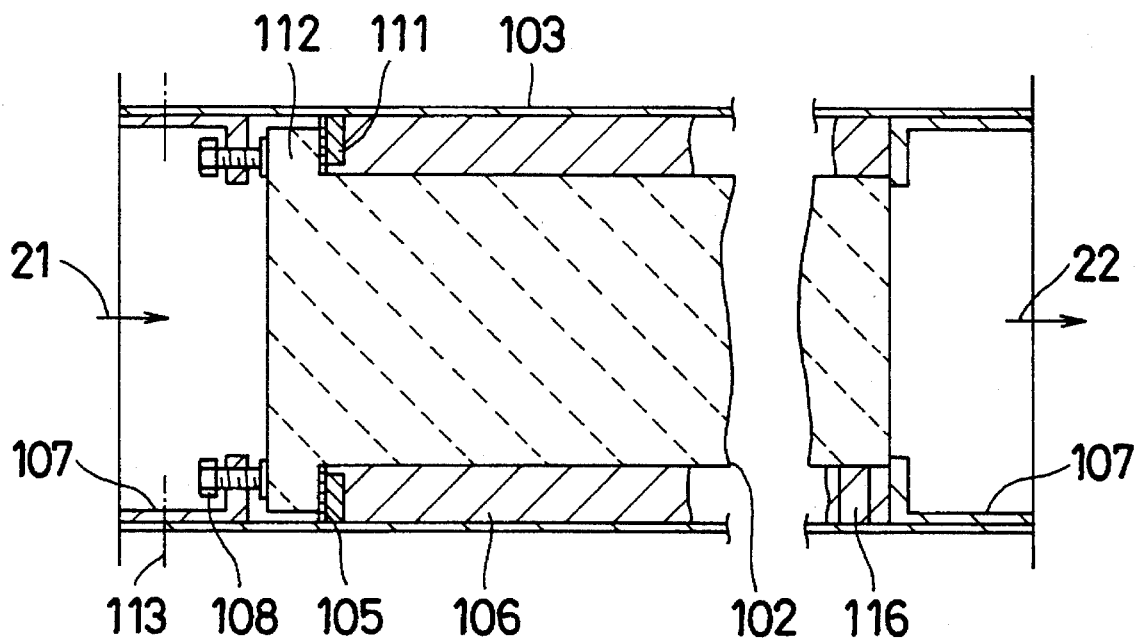
FIG. 4 is a sectional view of a filter element of a second embodiment of the present invention with the filter element being mounted.
Figure 5:
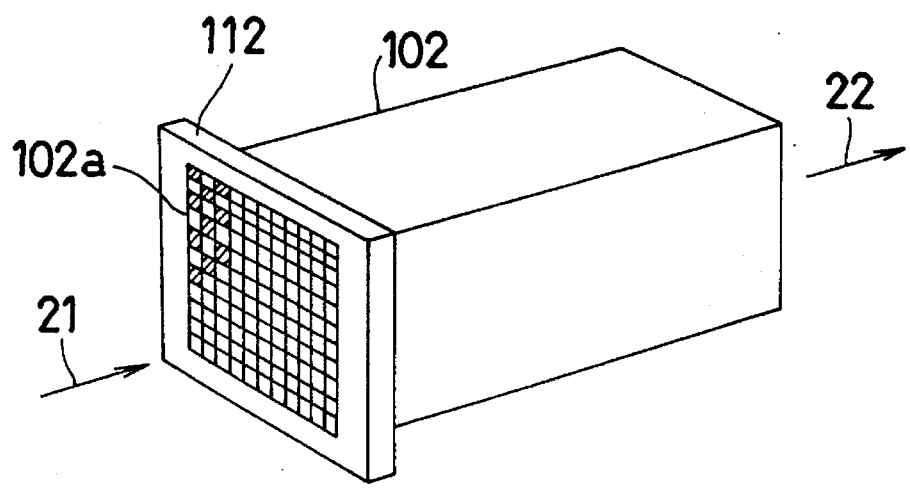
FIG. 5 is a perspective view of a honeycomb filter element of the embodiment in FIG. 4.
Figure 6:
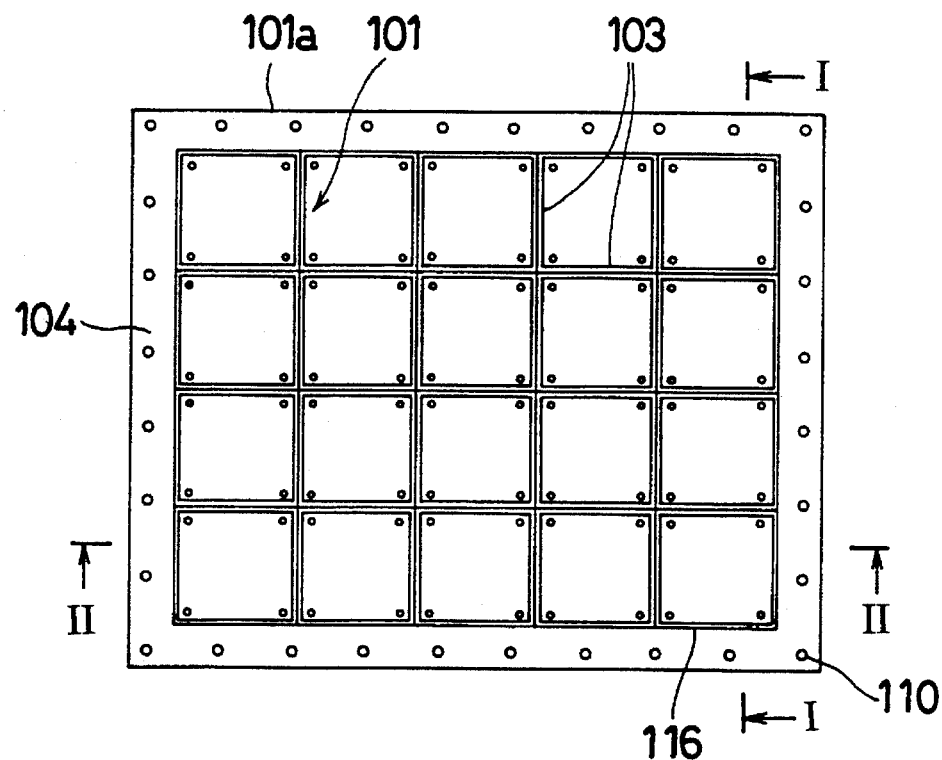
FIG. 6 is a front view of a honeycomb pack of the embodiment above.
Figure 7:
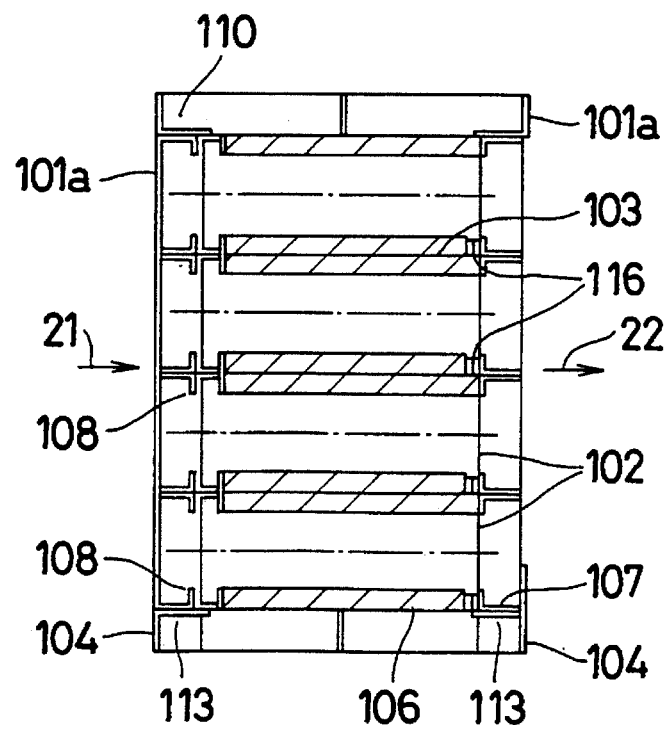
FIG. 7 is a sectional view taken along line B—B of FIG. 6.
Figure 8:
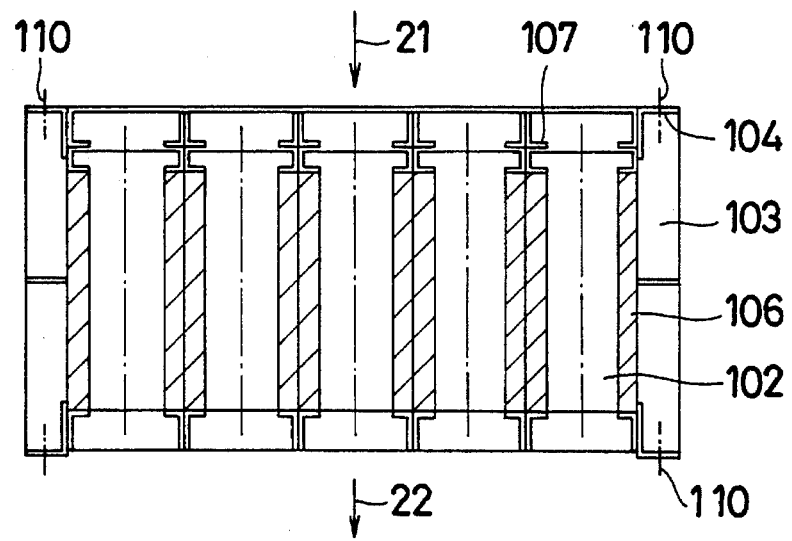
FIG. 8 is a sectional view taken along line C—C of FIG. 6.

Referring now to FIGS. 4 to 9, a second embodiment of the present invention is described. As shown in FIGS. 6 to 8, the embodiment includes a honeycomb pack 101 having a substantially square cross-section and formed by 20 horizontally disposed honeycomb type filter elements 102 collected to be accommodated to form a unit lot. The honeycomb pack 101 includes, as shown in FIGS. 6 and 7, square pack frame bodies 101a, 101a having an L-shaped cross-section and disposed at both sides thereof. A plurality of filter element mounting frames 103 previously mounted to the pack frame bodies 101a, 101a and horizontally disposed are arranged into a lattice and the filter elements 102 are mounted in the filter element mounting frames 103.

As shown in FIGS. 4 and 5, the filter element 102 includes a seal flange 112 disposed at an end on the side receiving of dirty gas 21, the flange being protruded therefrom. The filter element 102 includes a plurality of plate-like porous ceramic bodies 102a disposed to cross each other horizontally and vertically so that the filter element is divided into a plurality of honeycomb gas passages horizontally and vertically, and closed portions are disposed alternately at one end and the other end of the gas passages as shown by hatched portions of FIG. 5. Accordingly, dirty gas 21 coming into the passages from one open end as shown by the arrow of FIG. 5 is filtered by the porous ceramic bodies 102a and then comes into adjacent gas passages to be converted into purified gas, so that the purified gas 22 is discharged from the other open end.

A support and sealing structure between the individual accommodated filter element 102 and the filter element mounting frame 103 is now described. As shown in FIG. 4, a seal flange 111 is disposed in corresponding manner to the seal flange 112 disposed in the inlet side of dirty gas 21 of the filter element 102 so that the seal flange 111 is in contact with the downstream side (purified gas side 22) of the flange 112 at the inlet side of the dirty gas 21 of the filter element mounting frame 103. The filter element 102 is mounted in the filter element mounting frame 103 so as to be movable in the axial direction of the filter element 102 and a seal packing 105 is interposed therebetween. Further, metal mounting fittings 107 are disposed in front of and behind the filter element 102, that is, at the inlet side of dirty gas 21 and the outlet side of purified gas 22, in the filter element mounting frame 103 and are mounted by means of fixing bolts 113. The metal mounting fitting 107 disposed at the side of dirty gas 21 is provided with a pressing bolt 108 for securely pressing the seal flange 112 of the filter element 102, and a holding piece 116 is disposed between the filter element 102 and the filter element mounting frame 103 near the purified gas outlet to hold the filter element 102 horizontally. In addition, a gap between the filter element 102 and the filter element mounting frame 103 is filled with cotton-like ceramic fiber 106.

Figure 9:
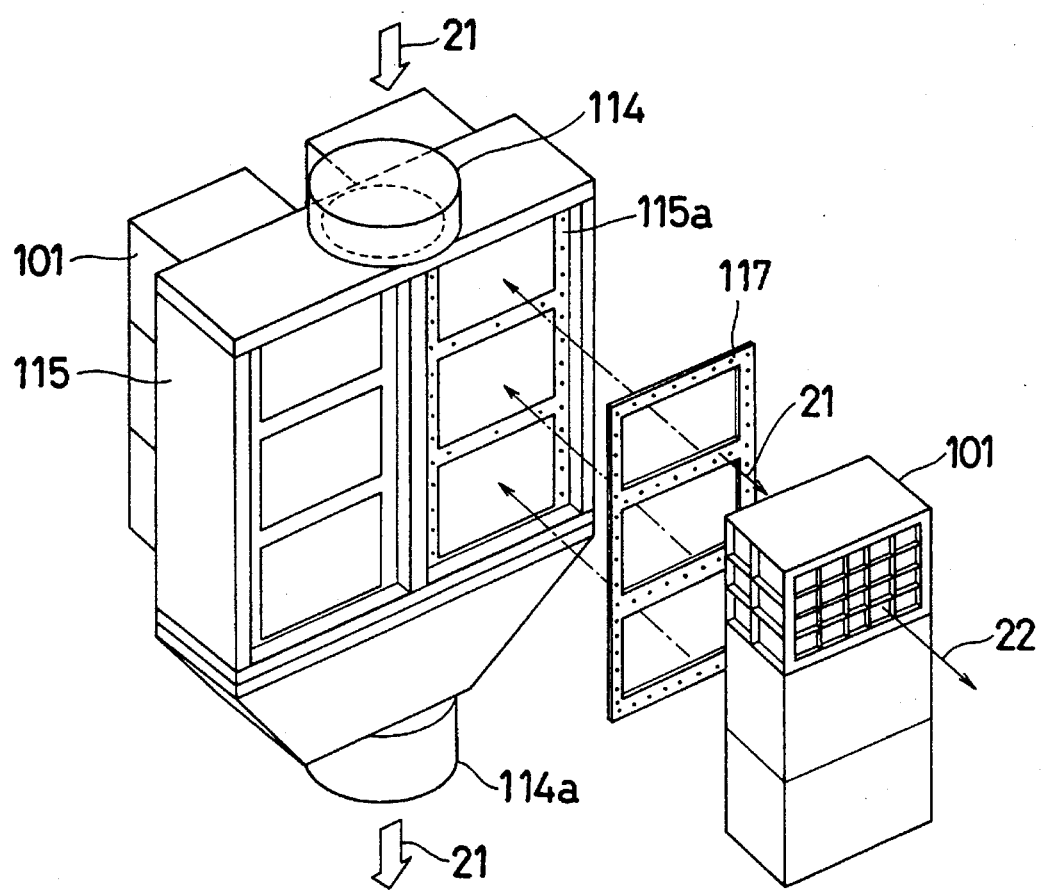
FIG. 9 is a perspective view showing a mounted honeycomb pack of the embodiment above.

A sealing and mounting structure of the honeycomb pack 101 including all of 20 filter elements 102 mounted as described above will now be described. As shown in FIGS. 6, 7 and 9, a plurality of honeycomb packs 101 are disposed on both sides of a duct 115 (which receives dirty gas) so as to be disposed in the vertical direction of a center portion and opposite to each other. A pack mounting metal fitting 104 is disposed on the dirty gas inlet side around the frame body 101a of the honeycomb pack 101 which is in contact with the dirty gas duct 115 and a seal packing 117 is held between a mounting flange 115a of the dirty gas duct 115 and the honeycomb pack 101 and is fastened by bolts 110 and nuts (refer to FIG. 8). In FIG. 9, numeral 114 denotes a scramble dirty gas duct for supplying the dirty gas 21 to the dirty gas duct 115 from the upper portion and numeral 114a denotes a scramble dirty gas duct for discharging the dirty gas 21 from the dirty gas duct 115 to the lower portion.

Figure 14:
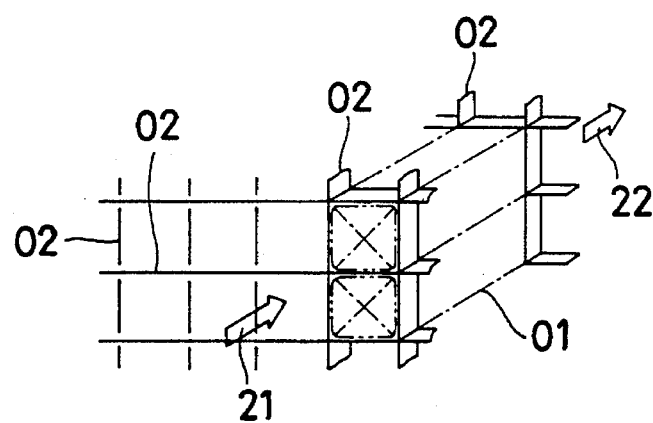
FIG. 14 is a schematic diagram illustrating a seal structure of a conventional honeycomb filter element.
Figure 15:
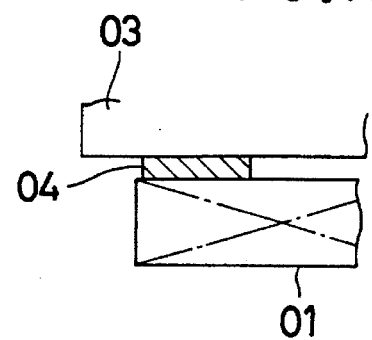
FIG. 15 is a schematic diagram illustrating a seal structure between a conventional honeycomb pack frame and the honeycomb filter element.

In the embodiment structured above, as shown by arrow of FIG. 9, the dirty gas 21 coming from the scramble dirty gas duct 114 into the dirty gas duct 115 enters the passages of the filter elements 102 of the honeycomb pack 101 and is filtered upon passing through the porous ceramic bodies 102a of the filter elements 102 to become the purified gas 22. The purified gas 22 comes into the passages of the adjacent filter elements 102 and is taken out from the honeycomb pack 101. At this time, since the seal flanges 112 are disposed on the side of the dirty gas 21 of the filter elements 102, the filter elements 102 receive large differential pressure as compared with the prior art so that the packing 105 is compressed as it is pressed by the seal packing 112 to improve the sealing characteristic. Accordingly, the sealing characteristic can be improved remarkably as compared with the conventional concentric seal in the flowing direction of gas shown in FIGS. 14 and 15. More particularly, since the conventional seal is dependent on the fastening force upon collection of the pack and has no force except the fastening force, the conventional seal is loosened due to the thermal extension difference during operation. Accordingly, when a differential pressure is applied, there is a vicious circle that the seal packing is gradually shifted to the center side and hence the hoops of the pack are further loosened. On the contrary, in the present embodiment, the differential pressure due to the dirty gas can be utilized to improve of the sealing characteristic as described above. Further, since the seal flange 112 on the side of dirty gas of the filter element 102 is held against the seal packing 105 by the filter element mounting frame 103, looseness and reduction of the sealing performance do not occur even if the extension difference due to the temperature occurs between the filter element 102 and the filter element mounting frame 103.

Figure 10A:
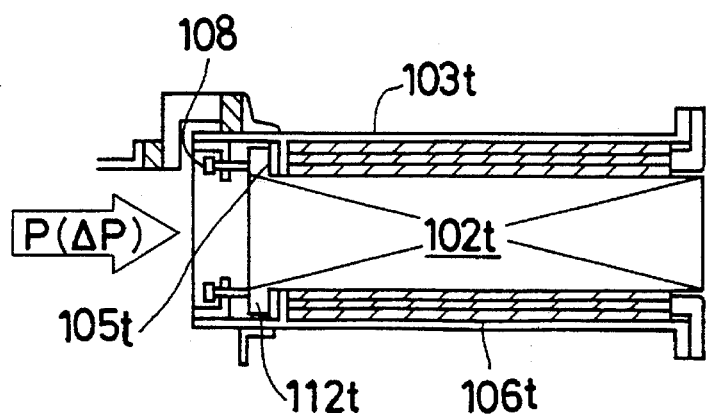
FIG. 10(a) is a schematic diagram illustrating an examination apparatus of the embodiment above.
Figure 10B:
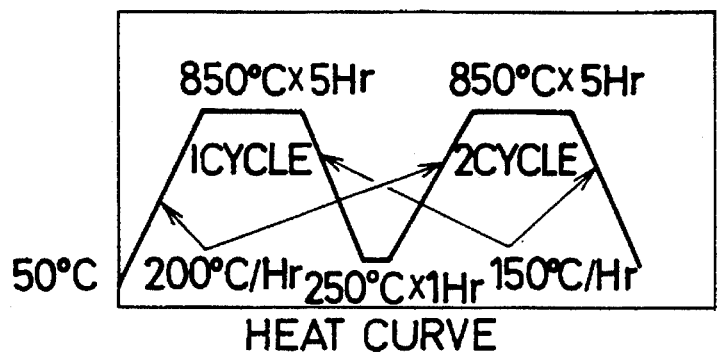
FIG. 10(b) is a diagram explaining a heat cycle in the examination.
Figure 10C:
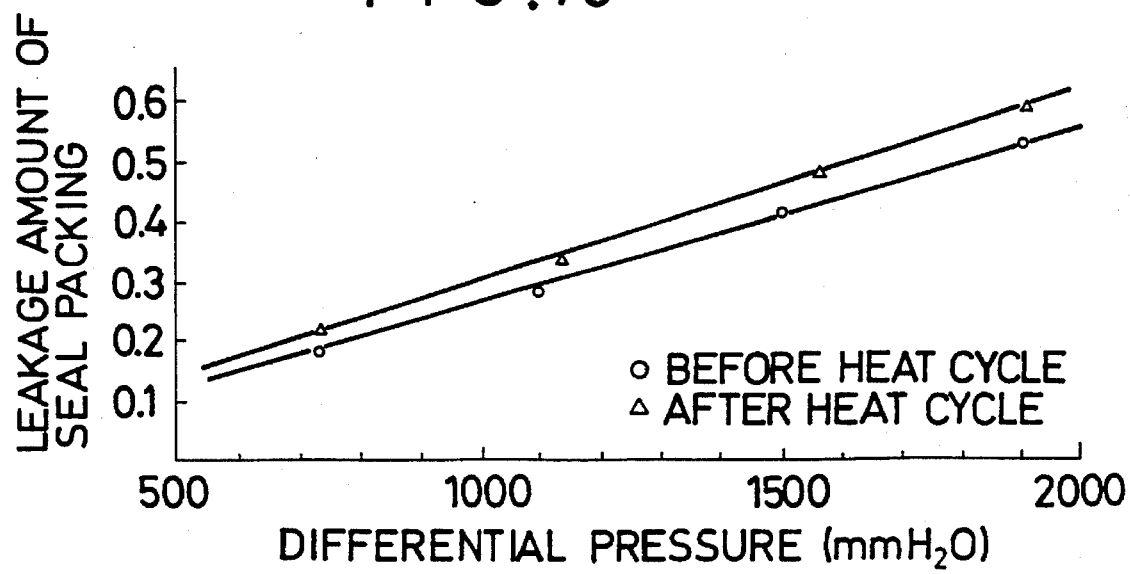
FIG. 10(c) is a graph showing an examination result.

FIG. 10 shows an examination apparatus of the sealing characteristic of the packing and an examination result thereof. As shown in FIG. 10(a), the examination apparatus used a metal element 102t having the same shape as that of the filter element 102 instead of the filter element 102 and the metal element 102t was accommodated in a pack 103t corresponding to the filter element mounting frame 103. Thus, an amount of leakage from a seal packing 105t (the seal packing 105 of the embodiment) using ceramic fiber 106t was measured while differential pressure $\Delta P$ is varied. An amount of gas leakage of the conventional system shown in FIGS. 14 and 15 indicated a relatively large value of 2 to 3%. The examination of the embodiment used the present metal element 102t including a flange 112t corresponding to the seal flange 112 and examined the leakage amount in the seal packing 105t for two cases before and after a heat cycle as shown in FIG. 10(c). The heat cycle shown in FIG. 10(b) was adopted. As a result, as shown in FIG. 10(c), it has been confirmed that the leakage amount is about 0.3% in the actually occurring differential pressure of 1000 to 1200 mm $H_2O$ of the dust removing apparatus and the leakage amount in the seal packing 105t is reduced greatly.

Further, in the embodiment, in order to reinforce and offset the above sealing performance, since the mounting metal fitting 107 is disposed on the inlet side of dirty gas and on the outlet side of purified gas of the filter element 102 so as to press the filter element 102 thereon, and the pressing bolt 108 is provided in the mounting metal fitting 107 on the inlet side of dirty gas to press the seal flange 112 of the filter element 102, looseness due to high temperature can be prevented and the filter element 102 can be exactly held against the differential pressure in the opposite direction upon the dust removing operation in the reverse direction. Further, providing the holding piece on the outlet side of purified gas prevents that the horizontal degree of the filter element 102 is varied from being varied so as to damage a root portion of the seal flange. In addition, since the space between the filter element mounting frame 103 and the filter element 102 is filled with the cotton-like ceramic fiber 106, vibration upon the dust removing operation in the reverse direction can be relieved.

Furthermore, in the above embodiment, since the pack mounting frame 104 of the frame body 101a of the honeycomb pack 101 is fixedly mounted to the mounting flange 115a of the opposite dirty gas duct 115 through the seal packing 117 by fastening the nuts to the bolts 110, the honeycomb pack can be mounted exactly in the improved state of the sealing characteristic.

In the above embodiment, the plurality of honeycomb packs 101 are disposed opposite to each other on both sides of the dirty gas duct 115, although single honeycomb packs can be disposed on each side of the dirty gas duct 115 to be opposed to each other. Alternatively, a single or a plurality of honeycomb packs can be disposed on only one side of the dirty gas duct 115. Further, in above the embodiment, the honeycomb pack 101 is mounted to the dirty gas duct 115 to hold the seal packing 117 therebetween, although the honeycomb pack 101 can be mounted to a duct on the side of purified gas through the seal packing.

INDUSTRIAL AVAILABILITY

As described above, in the dust removing apparatus according to the present invention, the flange is disposed on the dirty gas side of the filter element, and the purified gas side of the flange and the dirty gas side of the flange of the filter element mounting frame positioned on the purified gas side with respect to the flange, are disposed in opposing relationship to each other to hold the filter element in the filter element mounting frame, so that the purified gas side of the flange of the filter element is always pressed to the dirty gas side of the flange of the filter element mounting frame even if there is the thermal extension difference between the filter element and the filter element mounting frame. Since the leakage of dirty gas can be prevented exactly and the collection factor of soot dust can be improved, the dust removing apparatus can be widely utilized industrially.

Further, the plurality of honeycomb filter elements of porous ceramic substance are collected and accommodated to form a unit lot, and the seal packing is held between the purified gas side of the flange disposed on the dirty gas side of the filter element and the dirty gas side of the flange of the filter element mounting frame mounted to the honeycomb pack frame body to hold the filter element to thereby realize stable seal. In addition, the flange on the dirty gas side of the filter element is pressed to the flange of the filter element mounting frame through the packing by the pressure of the dirty gas, which is utilized as the pressing force to the packing and the filter element mounting frame, to thereby exactly attain the sealing operation. Furthermore, since the flange on the dirty gas side of the filter element is held by the flange of the filter element mounting frame, looseness and reduction of the sealing performance do not occur even if there is the extension difference due to the high temperature between metal and the filter element of ceramic substance, so that the collection factor of soot dust is improved and the dust removing apparatus is industrially useful.

We claim:

1. A dust removing apparatus for converting dirty gas into clean gas, the apparatus comprising:

a plurality of filter elements each of which is formed of a porous ceramic material and has a honeycomb structure, the plurality of filter elements being assembled into a substantially single honeycomb pack unit, and each filter element having a gas-receiving end through which dirty gas enters the filter element and a gas-emitting end via which clean gas exits the filter element;

a plurality of mounting frames each of which holds one of the filter elements and permits movement of the filter element with respect to the mounting frame in the direction which dirty gas enters the filter element; and a honeycomb pack frame holding the plurality of mounting frames in the single honeycomb pack unit;

wherein each filter element includes a flange at the gas-receiving end thereof, the flange having a first side disposed at the gas-receiving end of the filter element and a second side disposed away from the gas-receiving end in a direction toward the gas-emitting end of the filter element, and wherein the corresponding mounting frame for each filter element includes a flange with a surface located adjacent the second side of the filter element flange, wherein a seal is maintained between the respective flanges by pressure exerted by the dirty gas on the gas-receiving end of the filter element which forces the flange of the filter element toward the surface of the flange of the mounting frame; and wherein each mounting frame includes fittings disposed adjacent the gas-receiving and gas-emitting ends of the filter element, and wherein the fitting located at the gas-receiving end is provided with a pressing bolt which engages the flange of the filter element, a holding piece is disposed between the filter element near the gas-emitting end thereof and the mounting frame, and wherein fiber fills a space between the filter element and the mounting frame.

2. An apparatus according to claim 1, further comprising pack mounting fittings formed of metal, the pack mounting fittings being disposed on a gas-receiving side and a gas-emitting side of the honeycomb pack unit, wherein one of the pack mounting fittings is fixed to a frame of a gas duct so as to capture a sealing member therebetween.

* * * * *